May 15, 1945.   E. R. HACMAC   2,376,052
DEVICE FOR AERATING AND DISPENSING LIQUID PRODUCTS
Filed June 30, 1941   2 Sheets-Sheet 1
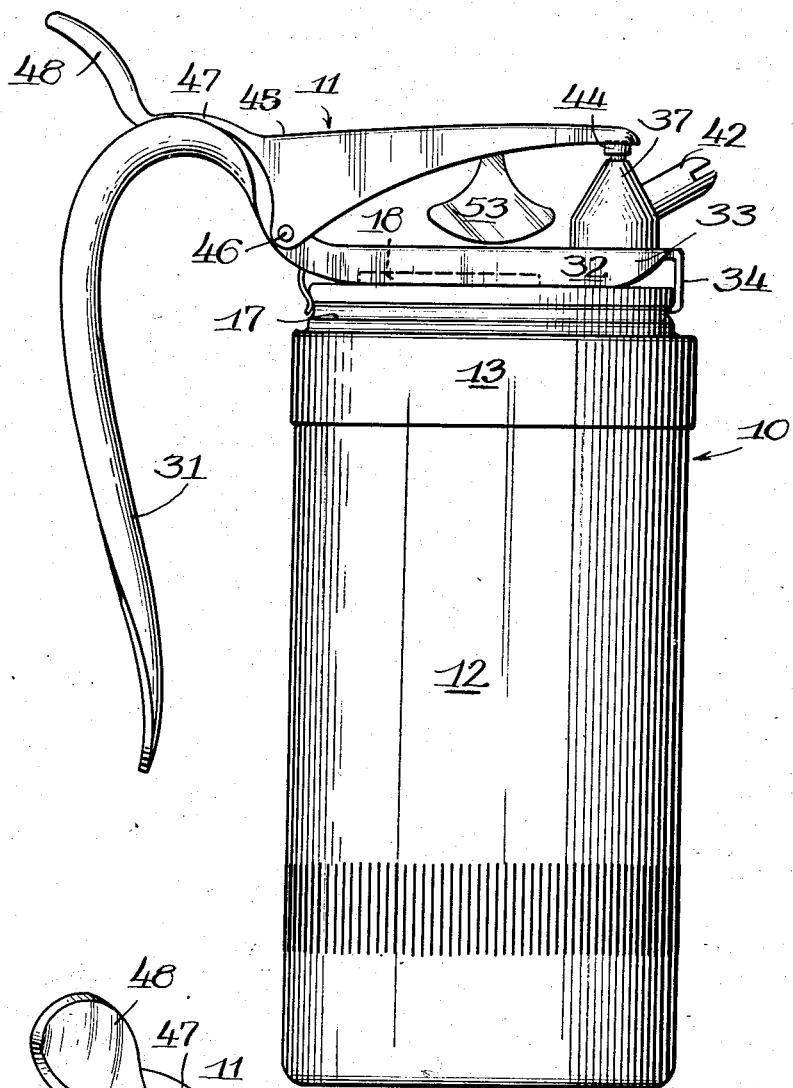
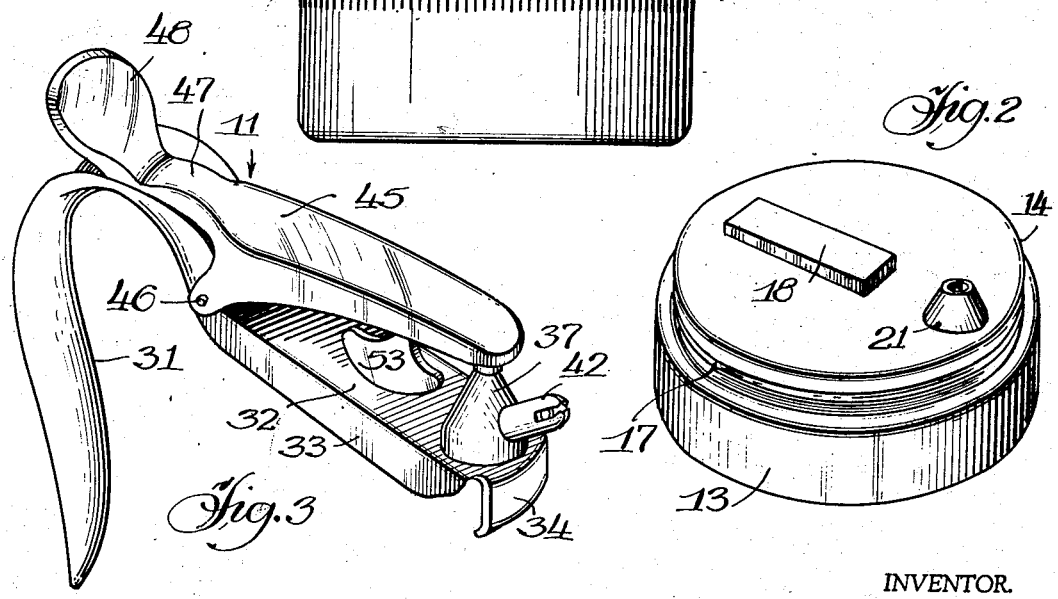
INVENTOR.
BY Edward R. Hacmac, May 15, 1945. E. R. HACMAC 2,376,052
DEVICE FOR AERATING AND DISPENSING LIQUID PRODUCTS
Filed June 30, 1941 2 Sheets-Sheet 2
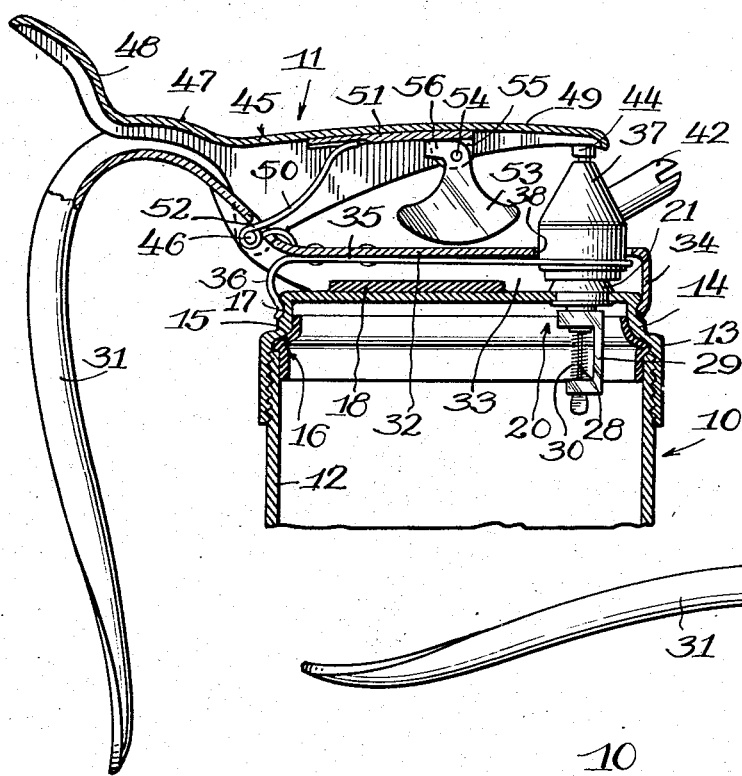
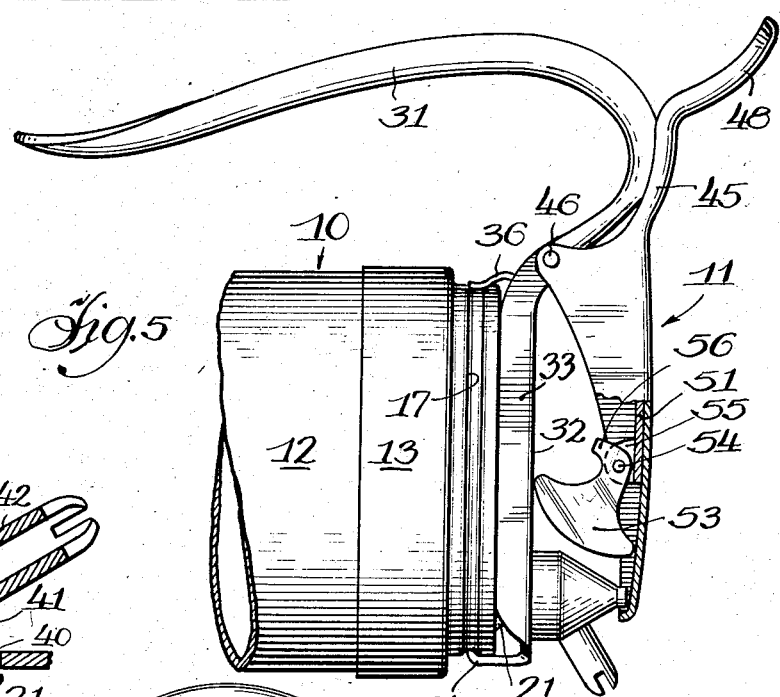
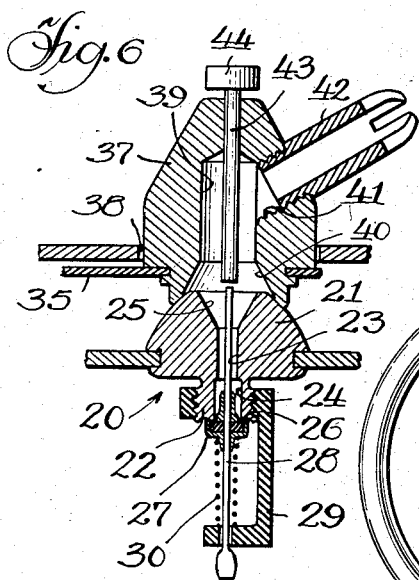
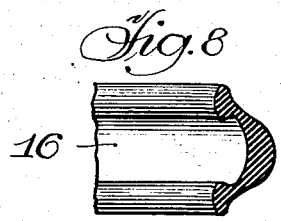
INVENTOR.
Edward R. Hacmac,
Parkinson + Lane Attys.

Patented May 15, 1945

2,376,052

UNITED STATES PATENT OFFICE 2,376,052

DEVICE FOR AERATING AND DISPENSING LIQUID PRODUCTS

Edward R. Hacmac, Glendale, Calif., assignor of ninety per cent to Maurine Squires, Glendale, Calif.

Application June 30, 1941, Serial No. 400,405

4 Claims. (Cl. 222—153)

The invention relates generally to a device for aerating and dispensing products such as flowable creams or pastes and is particularly adapted for whipping and dispensing cream in the home or elsewhere.

The devices for this purpose, suggested in the past, have generally employed a siphon tube extending from the valve in the top of the device to a point near the bottom thereof and/or extensive and elaborate distributing means. The devices so constructed have been unsatisfactory both from an operative standpoint and also because they are incapable of being cleaned, thus rendering the devices unsanitary.

It is a general object of the invention, therefore, to provide a new and improved cream whipping device which while eliminating entirely the siphon tube and/or extensive distributing means, is so arranged and combined as to compel when in operation the gas to pass through the liquid whereby gas can not be discharged without performing the whipping operation.

It is a further object to provide such a device which is sanitary, safe and incapable of improper operation by the user and which can be readily cleaned.

A more particular object is to provide a whipping and dispensing device having valve means of new and improved construction opening to the top of the device so as to permit elimination of the unsanitary siphon tube and/or objectionable distributing means.

Another object is to provide a device of the character described having valve means opening to the top thereof and dispensing control apparatus compelling the device to be tilted before the apparatus can be operated so as to assure proper position of the device before use and thereby insure that the gas can only be used while the whipping operation is in progress and thus prevent the discharge of gas without performing its intended function.

A further object is to provide a device of the character described having a dispensing control apparatus which can be readily and quickly attached to the bottle and detached and when applied is incapable of actuation except when the device is tilted on its side to an extent to cause the gas to pass through at least a part of the liquid contents in the device before passing through the outlet valve.

It is a further object to provide improved sealing means between the container or bottle and its cap whereby a tight leakproof seal is afforded as soon as a very slight pressure of gas is injected into the container or bottle without the necessity of screwing the cap down tightly by means of wrenches or the like.

Other objects and advantages will become apparent from the following detailed description taken in connection with the accompanying drawings, in which I have illustrated one form of my invention but the construction there shown will be understood as illustrative only and not as defining the limits of my invention.

Referring to the drawings:

Fig. 1 is a side elevational view of a device embodying the features of the invention;

Fig. 2 is a perspective view of the closure for the container of the device;

Fig. 3 is a perspective view of the dispensing control apparatus;

Fig. 4 is a fragmentary view partially in elevation and partially in section, showing the device with the dispensing control apparatus in inoperative position;

Fig. 5 is a fragmentary elevational view with parts broken away, showing the device in its tilted operative position;

Fig. 6 is an enlarged sectional view of the valve means;

Fig. 7 is a detail view of the sealing washer; and

Fig. 8 is an enlarged fragmentary and sectional view of the washer of Fig. 7 in its natural shape.

The cream aerating and dispensing device shown in the drawings for purposes of disclosure comprises generally a metal bottle or container 10 and dispensing control apparatus 11. In use, the container 10 is filled about one-third full with cream at the dairy or a central cream depot or station. Thereafter the container is filled with a suitable gas, for example, nitrous oxide gas, to a suitable pressure, for example, of from one hundred twenty-five to one hundred fifty pounds. The container thereafter is delivered to a housewife or other user. The user provides and keeps in his possession the dispensing control apparatus 11 which is applied to each newly delivered container for operating the dispensing valve when it is desired to aerate and dispense the contents.

More particularly, the container 10 which preferably is metal, is composed of a main, generally cylindrical portion 12 open at one end, and a closure or cap 13. The main portion of the container and the closure 13 are provided with complementary threads by means of which the closure is firmly secured onto the main portion 12. Outwardly of the threaded portion, the closure 13 has a portion 14 of somewhat reduced diameter providing an internal annular shoulder 15 serving to receive between it and the end of the portion 12 a sealing gasket 16 of suitable flexible material for example rubber. This gasket in its natural state has the shape shown in Fig. 8, but under the high pressures, in the container 10, assumes the cross section shown in Fig. 4, and thus serves very effectively to seal the joint between the main portion 12 of the container and the closure 13 when the gas is injected into the bottle under pressure. With a sealing rubber gasket such as illustrated it is unnecessary to use a wrench or clamp to screw on or unscrew the sealing cap. It is only necessary to screw the sealing cap on to the bottle or container lightly as the rubber sealing gasket 16 is so designed that as soon as a very slight pressure of gas is injected into container, the gasket walls automatically expand against the walls of the container and the sealing cap and thereby create a tight leakproof seal. In the prior structures a flat rubber ring commonly known as a "fruit jar ring" was used. With such a ring it was necessary to provide a shoulder on the top edge of the container for the ring to lay on and it was necessary to tighten the sealing cap with a powerful wrench as there was no expansion to the rubber ring and therefore the only seal obtainable was obtained by tightening the cap on the container by some device such as a vise and wrench. Also the shoulder, such as was necessary to carry the common rubber ring, there existed a very unsanitary crevice on the under side of the shoulder.

Externally there is formed in the reduced portion 14 of the closure an annular groove 17 to which the dispensing control apparatus is readily and quickly attached and detached, as will presently become more apparent.

Mounted on top of the closure 13, as by welding, and extending diametrically thereof, is an elongated block 18 forming a retaining guide for the dispensing control apparatus.

The closure 13 has formed therein near its periphery an aperture in which is mounted valve means generally designated 20 controlling the discharge from the container, and also serving as the cream and gas is concomitantly forced therethrough by the pressure within the bottle to aerate the cream and intermingle and mix the gas finely and intimately with the cream and thereby break up the fat particles so that the cream is discharged as a fluffy and foamy mass.

The valve means (see Fig. 6) comprises a dome-shaped housing 21 with its base inserted into the aperture in the closure and secured in the closure in any suitable manner, to provide an airtight joint. Depending from the housing 21 is a tubular portion 22 and extending axially through the housing is a constricted passage 23 connecting with an enlarged initial mixing chamber 24 in the tubular portion 22. The constricted passage at its opposite end opens into an inverted truncated chamber 25 forming a second expansion and mixing chamber 25.

At its inner end the tubular portion 22 provides a seat 26 for a valve 27 mounted on a valve stem 28 which extends in both directions from the valve so as to project outwardly of the housing through the constricted passage 23 and also downwardly, through a bracket 29 which depends from the tubular portion 22, to provide a guide for the valve stem. The bracket 29 also provides an abutment for one end of the compression spring 30 encircling the valve stem 28 which spring at the other end bears against the valve 27 to automatically urge the same toward seated position or closed position. It is apparent that with the valve mounted internally the pressure within the container will also serve to seat the valve and final seal of the valve is thus not dependent upon the spring 30 alone. The bracket 29 is threaded onto the tubular portion 22 so as to be readily removable, such removal of the bracket permitting complete withdrawal of the valve to provide for ready and thorough cleansing of the valve means.

In practice, the closure 13 is removed to facilitate supplying the container with the desired amount of cream. The closure is then screwed in position and the gas injected through the valve means 20 until the desired pressure within the container is obtained. Thus filled with cream and gas under pressure, as previously stated, the container is delivered to the user who then applies the dispensing control apparatus 11.

This control apparatus comprises a sheet metal member bent to provide a handle 31 and a narrow elongated base 32 utilized in forming an attaching means for the apparatus. The base 32 in transverse cross section is generally channel shaped with its side walls or flanges 33 extending downwardly. At its end remote from the handle 31 the base 32 carries a resilient spring clip 34 for engagement with the annular external groove 17 formed in the closure. Riveted to the underneath side of the base 32 is a leaf spring 35 which, at the end remote from the spring clip 34 is bent into a clip 36 adapted to engage the groove 17 at a point diametrically opposite the lip 34 and thus securely but removably attach the handle to the container. When applied to the closure, the base 32 extends diametrically of the closure with the side flanges 33 resting on the top of the closure and straddles the block 18 which thus keeps the base from rotating relative to the closure.

At its opposite end, the member 35 carries a housing 37 which projects upwardly through an aperture 38 in the base 32. This housing is provided with an elongated expansion chamber 39 opening downwardly and terminating in an outwardly flaring portion 40 adapted to fit over and partially receive within the flaring portion 40 the upper end of the cooperating expansion chamber 25. Opening laterally to the expansion chamber 39 is a threaded passage 41 into which is threaded a tubular discharge spout 42. Projecting slidably through the upper end of the housing 37 is a valve actuating pin 43 having a head 44 and being of such length that when pressed inwardly it will engage the end of the valve stem 28 and open the valve. It will be seen that the chamber 39 in conjunction with the chamber 25 forms an expansion chamber for the fluffy, foamy mass of whipped cream.

The pin 43 is adapted to be actuated to open the valve 27 while the container is supported by the user, grasping the handle 31, through the medium of a lever 45. This lever is pivoted intermediate its ends on a pin 46 extending transversely of the base 32 and has an arm 47 overlying the top curved portion of the handle 31 and terminating in an upwardly extending portion 48 serving as a seat against which the thumb of a user of the device is placed to pivot the lever in a clockwise direction as viewed in the drawings. Extending in the opposite direction is an arm 49 terminating over the head 44 of the pin 43. The lever is urged in a counterclockwise direction by means of a torsion spring 50 wound about the pin 46 and bearing at one end against a reinforcing plate 51 mounted underneath the arm 49, and at the other end against the base 32. The handle 31 at its base is cut away at 52 to permit the ends of the spring 50 to project therethrough.

With the employment of a valve means opening to the top of the container, it is, of course, essential for a proper operation of the device that the container be tilted from an upright position to an inclined position in which the cream or other liquid food product in the container is adjacent the valve means and the gas is behind the food product, speaking with reference to the valve means. Accordingly, means is provided herein for compelling the user of the device to tilt the same to the proper position before the dispensing control apparatus may be manipulated to open the valve. Herein this means takes the form of a segmental pendant 53 which is pivotally suspended beneath the arm 49 of the lever 45 on a pin 54 extending between ears 55 on the reinforcing plate 51. The pin 54 extends transversely of the arm 49 so that the pendant swings only in the plane of movement of the lever 45 and the pendant, moreover, is formed with a heel 56 extending toward the handle 31 so that it is not free to pivot in a clockwise direction from its normal position shown in Fig. 4. It will be seen from the above that the pendant 53 will swing by gravity from its position shown in Fig. 4 only when the device is tilted toward a horizontal position with the valve means on the underneath or lower side. When, however, the device is so tilted from its normal upright position to the horizontal position shown in Fig. 5, the pendant swings by gravity to the position shown in Fig. 5. The pendant is so proportioned as to length and maximum width that it will strike the base 32 and thus block actuation of the lever 45 to open the valve means 20 in all positions of the device short of the horizontal position shown in Fig. 5. In this latter position, it frees the lever 45 for pivotal movement in a clockwise direction for the purpose of depressing the pin 43 to open the valve means 20.

The operation and method employed is as follows: The first step is to fill the bottle about one-third full of cream. The bottle closure is then applied to the bottle. Next the nitrous oxide gas is introduced into the bottle by a suitable means, preferably from one hundred twenty-five to one hundred fifty pounds. When it is desired to use the device for whipping and dispensing cream, the device first must be tilted before it can be operated, thus causing the gas to pass through the cream. When in this position the valve can only be opened. When open the gas and cream are forced into the first mixing chamber and then passed through a relatively constricted orifice to where the mixture is discharged into a relatively large mixing and expansion chamber where the pressure is reduced and the air and gas caused to swirl about in untold rotary paths and the gas and cream thoroughly mixed and the cream thoroughly aerated and reduced to a fluffy foamy mass, from where it is discharged through the restricted fluted nozzle in ribbon-like fluffy formation. In order to obtain the best results it is extremely important that the constricted opening 23 leading from the first to the second mixing chamber be only slightly larger than the valve stem extending through said opening in order that the area of said opening through which the mixed gas and cream travel is but a small fraction of the cross sectional area of the second mixing chamber.

It is believed apparent from the foregoing that I have provided a cream whipping and dispensing device embodying many new and improved features. I have provided a valve means and cooperating nozzle of such construction that the cream is effectively whipped even though only a short passage is employed, thereby enabling, among other things, the elimination of the siphon tube heretofore employed. The device is thus much more sanitary and the valve structure, moreover is readily completely disassembled so as to give ready access to all the parts and passages for thorough cleaning thereof. Most important of all, my device is proof against improper operation by a user and assures that the operator will not accidentally waste the gas in the container and that the device will, before use, be placed in the proper position to assure correct action of the gas on the cream as it flows through the discharge valve means.

Having disclosed my invention, I claim:

1. A dispensing and control apparatus for use with a cream aerating and dispensing device, a container, a discharge valve means mounted in the top thereof and including a valve housing disposed outwardly of the container, a handle, means for detachably securing said handle to the container and extending diametrically over the top of the container when applied thereto, a housing carried by said attaching means at the end remote from said handle and adapted to fit over and partially receive within it the valve housing of the valve means, a discharge spout on said first mentioned housing, a valve actuating pin slidably mounted in said first mentioned housing, a pivotally mounted lever for actuating said pin, and a pendant pivotally mounted on said lever between said lever and said attaching means, said pendant when in normal position being so arranged as to prevent actuation of said lever when said attaching means is horizontally disposed and swinging by gravity to free said lever for actuation only when the apparatus is turned on end with the spout lowermost.

2. A dispensing control apparatus for use with an aerating and dispensing device having a container for the food product to be aerated and a discharge valve mounted in the top of the container and including a valve housing disposed outwardly of the container, an operating handle, attaching means for removably attaching said handle to the container comprising an elongated base portion integral with said handle terminating at one end in a depending lip and a leaf spring secured to said base portion and bent to form a spring clip diametrically opposite said lip, a housing carried by said attaching means adapted to seat partially over the valve housing of the valve means when the control apparatus is applied and providing an expansion chamber, a discharge spout on said first mentioned housing, a pin slidably mounted in said housing and adapted when pressed inwardly to open the valve means, a pivotally mounted lever having an arm extending to engage said pin, and a second arm overlying a portion of said handle to be actuated by a digit of the hand of the user grasping said handle, and a pendant suspended from said lever between said lever and said base portion pivotally mounted to swing only in the plane of movement of said lever and only in a direction toward said housing, said pendant when in normal position being so arranged as to prevent manipulation of said lever to depress said pin when the apparatus is vertically disposed and swinging by gravity to free said lever for manipulation when the apparatus is turned to a horizontal position with the nozzle lowermost.

3. In a device for whipping and dispensing cream by discharge under gas pressure, discharge valve means comprising a body member having a passage extending therethrough to open at one end to atmosphere and at the other end to the interior of the device, said passage at the end opening to atmosphere terminating in an outwardly flaring portion and at the opposite end being enlarged with respect to the intermediate portion, a valve seat surrounding the inner end of said passage, a valve cooperating with said seat, a valve stem extending in both directions from said valve, one part of said valve stem projecting outwardly of said body member to provide actuating means for said valve, a bracket detachably secured to said body member, the other part of said valve stem projecting through said bracket to be guided thereby, and a compression spring urging said valve to seated position.

4. In a device for whipping and dispensing cream by discharge under gas pressure, the combination of discharge valve means comprising a nipple-like body member having a passage extending therethrough to open at one end to atmosphere and at the other end to the interior of the device, said passage at the end opening to atmosphere terminating in an outwardly flaring portion and at the opposite end being enlarged with respect to the intermediate portion, a valve seat surrounding the inner end of said passage, a valve cooperating with said seat and having a valve stem extending outwardly through the passage to provide for actuation of the valve from externally of the device and a nozzle having a chamber terminating in an outwardly flaring portion for the partial reception therein of said body member, a passage opening laterally to the chamber in said nozzle, a discharge spout mounted in the passage, and a pin extending slidably through said nozzle for engagement with the end of said valve stem.

EDWARD R. HACMAC.